US009407377B2

(12) United States Patent
Young

(10) Patent No.: US 9,407,377 B2
(45) Date of Patent: Aug. 2, 2016

(54) INTERFERENCE CANCELLATION

(71) Applicant: enModus Limited, Monmouthshire (GB)

(72) Inventor: Philip Young, Monmouthshire (GB)

(73) Assignee: enModus Limited, Monmouthshire (GB)

( * ) Notice: Subject to any disclaimer, the term of this patent is extended or adjusted under 35 U.S.C. 154(b) by 0 days.

(21) Appl. No.: 14/423,883

(22) PCT Filed: Sep. 9, 2013

(86) PCT No.: PCT/GB2013/052351
§ 371 (c)(1),
(2) Date: Feb. 25, 2015

(87) PCT Pub. No.: WO2014/037742
PCT Pub. Date: Mar. 13, 2014

(65) Prior Publication Data
US 2015/0244474 A1    Aug. 27, 2015

(30) Foreign Application Priority Data

Sep. 7, 2012   (GB) .................................. 1215992.7

(51) Int. Cl.
*H04B 15/00*   (2006.01)
*H04B 1/38*    (2015.01)
(Continued)

(52) U.S. Cl.
CPC .................. *H04B 15/00* (2013.01); *H04B 1/38* (2013.01); *H04B 1/707* (2013.01); *H04B 3/54* (2013.01); *H04L 5/14* (2013.01)

(58) Field of Classification Search
CPC ...... H04B 1/38; H04B 1/3827; H04B 1/3833; H04B 1/40; H04B 1/403; H04B 1/405; H04B 1/406; H04B 1/50; H04B 1/52; H04B 1/707; H04B 1/7073; H04B 1/7075; H04B 3/21; H04B 3/23; H04B 3/232; H04B 3/237; H04B 3/238; H04B 3/32; H04B 3/54; H04B 15/00; H04L 5/14; H04L 5/143; H04L 5/1461
USPC ......... 375/133, 134, 141, 144, 145, 219, 222, 375/260, 262, 265, 273, 275, 278, 284, 285, 375/296, 297; 370/208, 210, 278, 282, 286, 370/289; 379/406.01, 406.05, 406.1; 455/42–44, 61, 73, 78, 86, 88
See application file for complete search history.

(56) References Cited

U.S. PATENT DOCUMENTS 6,735,181 B1   5/2004   Babitch
7,916,671 B1   3/2011   Zortea
(Continued)

FOREIGN PATENT DOCUMENTS

WO   WO 2011/161476   12/2011

OTHER PUBLICATIONS

Antonio-Rodriquez et al.: "Adaptive self-interference suppression . . . relays with multiple receive antennas", IEEE 13th Int'l Workshop on SPAWC, Jun. 17, 2012. pp. 454-458.

*Primary Examiner* — Young T Tse
(74) *Attorney, Agent, or Firm* — Wood, Phillips, Katz Clark & Mortimer

(57) ABSTRACT

A transceiver for full-duplex communication. The transceiver comprises: a transmitter and a receiver. The transmitter has a first oscillator circuit, for generating a transmit-carrier signal; and a first mixer, for up-converting a data signal to be transmitted by mixing it with the transmit-carrier signal, said data signal comprising a plurality of data symbols. The receiver has: a second oscillator circuit, for generating a receive-carrier signal; and a second mixer for down-converting a received signal by mixing it with the receive-carrier signal. The first oscillator and second oscillator are controlled such that there is a predetermined phase relationship between the transmit-carrier and receive-carrier signals at the start of each transmitted data symbol. The transceiver further comprises an interference cancellation circuit adapted to generate, based on the data signal to be transmitted and the predetermined phase relationship, an estimate of an interference component present in the received signal, and to compensate for the interference using the estimate.

15 Claims, 10 Drawing Sheets

(51) Int. Cl.
*H04B 1/707* (2011.01)
*H04B 3/54* (2006.01)
*H04L 5/14* (2006.01)

(56) References Cited

U.S. PATENT DOCUMENTS

| | | | |
|---|---|---|---|
| 2001/0033611 A1* | 10/2001 | Grimwood et al. | 375/219 |
| 2003/0098806 A1 | 5/2003 | Green | |
| 2007/0184782 A1 | 8/2007 | Sahota | |
| 2008/0009258 A1* | 1/2008 | Safarian et al. | 455/307 |
| 2008/0041953 A1 | 2/2008 | Frederick | |
| 2009/0015378 A1 | 1/2009 | Song et al. | |
| 2009/0023404 A1* | 1/2009 | Leinonen et al. | 455/114.2 |
| 2009/0050685 A1 | 2/2009 | Frederick | |
| 2009/0156135 A1* | 6/2009 | Kamizuma et al. | 455/73 |
| 2009/0304133 A1 | 12/2009 | Umari et al. | |
| 2011/0300914 A1* | 12/2011 | Gudem et al. | 455/574 |

* cited by examiner

INTERFERENCE CANCELLATION

FIELD OF THE INVENTION

This invention relates to a method and apparatus for reducing interference in a transceiver. It is particularly relevant to communications over power-lines, such as a ring-main circuit in a building.

BACKGROUND OF THE INVENTION

In order to communicate over a wireless or wired channel, it is common practice to divide the frequency spectrum into multiple channels (frequency division multiplexing). Data is modulated into a specific channel by mixing it with a carrier signal and filtering to limit the bandwidth of the transmitted energy, such that the energy radiated out of band is small enough not to interfere with communications in adjacent channels. Whilst in theory it is possible to provide any level of filtering in generating the signal to be transmitted, and to filter the received signal to remove energy from adjacent channels, there is a significant cost and power penalty in achieving high levels of signal rejection. In addition, whilst it is theoretically possible to generate a signal in the digital domain which is extremely well constrained in the frequency domain, in practice the signal is coupled to the medium through analogue circuitry. The inevitable non-linearity of real-world analogue components generally results in distortion of the signal, causing some energy to be radiated out of band.

In order to receive such a modulated signal it is necessary to down convert the signal to baseband, by mixing it with a replica of the carrier frequency and filtering the mixer output to extract the desired information-carrying component. This mixing can be done in the digital or analogue domain; however, digital mixing requires sampling the data at much higher rate—increasing the power and therefore cost of the digital components. Consequently, it is common to perform the down-conversion in the analogue domain, followed by filtering the output of the mixer to limit the bandwidth and then sampling into the digital domain using an Analogue-to-Digital Converter (ADC).

FIG. 1 illustrates a typical channelization of a full duplex communication system where the transmit (Tx) and receive (Rx) channels are separated in frequency by a distance significantly greater than the channel bandwidth. The plot shows the local transmit spectrum, normalized to 0 dB at the transmitter centre frequency. This is the typical signal at the output of the Tx filter. FIG. 2 shows a similar channelization of a full duplex communications system where the channel separation is significantly smaller in relation to the channel bandwidth. This plot shows the Rx spectrum with receive path attenuation of 60 dB, typical of the received signal at the media interface. In this case, the Tx signal remains adjacent to the Rx signal after down-conversion and therefore it needs a much sharper filter roll-off in order to prevent the Tx energy being present in the Rx signal. This implies that a significantly more complex and expensive solution is required.

In addition to this, there is a small amount of spreading which occurs due to non-linearities in the mixer. This results in a small amount of energy due to the near-end transmitter appearing at the output of the mixer in the receive-chain, which resides in the frequency band of interest. Although this may be attenuated compared to the total transmitted energy, it can still be very significant when compared to the energy received from the far-end transmitter, after accounting for signal transmission losses. Accordingly, this residual component of the (near-end) transmitted energy can limit the achievable sensitivity.

Since the filter roll-off in the analogue domain is often significantly limited by cost constraints, it is desirable to keep a large channel separation between the Tx and Rx channels compared with the channel bandwidth. Use of a large channel separation between the transmit and receive channels means that the near-end transmitter signal is more attenuated out-of-band by the filters in the receive-chain, prior to sampling to digitise the signal.

The sampling of the signal results in all energy in the signal being captured. Any energy which is present outside of the sampling bandwidth is aliased into the sampled signal. Once this has happened, the energy is within the bandwidth of the signal of interest and cannot be removed by a simple filtering process. The solution to this problem in a typical wireless communications system is to use a channel separation between the Tx and Rx channels which is much greater than the bandwidth of the signal being carried by the channel. In this way, after down-conversion of the receive channel, any energy from the transmit channel has a large frequency offset from the desired energy of the received channel and can be effectively removed using simple low-pass or band-pass filters prior to sampling. However, increasing the channel separation inherently means that spectral bandwidth is used less efficiently.

Due to spectrum availability and licensing it is not always possible to allocate channels for transmission and reception having the desired wide separation and it is necessary for the two channels to be adjacent to each other within a very narrow spectrum window. One example of this is the use of the CENELEC band B for power-line communications, where the spectrum from 95 to 125 KHz is available for use without access restrictions, subject only to regulations regarding maximum transmitted energy, and spurious emissions outside of this spectrum.

BRIEF SUMMARY OF THE INVENTION

According to an aspect of the invention, there is provided a transceiver for full-duplex communication, comprising:
a transmitter, having
 a first oscillator circuit, for generating a transmit-carrier signal; and
 a first mixer, for up-converting a data signal to be transmitted by mixing it with the transmit-carrier signal, said data signal comprising a plurality of data symbols; and
a receiver, having:
 a second oscillator circuit, for generating a receive-carrier signal; and
 a second mixer for down-converting a received signal by mixing it with the receive-carrier signal,
wherein the first oscillator and second oscillator are controlled such that there is a predetermined phase relationship between the transmit-carrier and receive-carrier signals at the start of each transmitted data symbol,
the transceiver further comprising an interference cancellation circuit adapted to generate, based on the data signal to be transmitted and the predetermined phase relationship, an estimate of an interference component present in the received signal, and to compensate for the interference using the estimate.

Here, a "predetermined" phase relationship means a predictable, known phase relationship. For example, the phase difference at the start of each symbol may assume one of a set of discrete values, with the value for each symbol being known. In general the system will tolerate a small amount of drift from the precise expected relationship. In practice, therefore, the "predetermined" relationship may be considered to be satisfied if the phase of each carrier is within ±10° of a nominal intended value at the start of each symbol. More preferably, the predetermined phase relationship will be satisfied to within ±5°, still more preferably ±2°.

The interference component comprises cross-talk from the transmitter. In general, this will depend upon the content of the data signal being transmitted as well as the relationship between the receiver-carrier phase and the transmit-carrier phase.

Enforcing a predetermined phase relationship between the two carrier signals can allow the interference caused by the transmitted signal in the received signal to be predicted and compensated for. In turn, this can enable effective full-duplex communication with relatively closely spaced Tx and Rx channels, without significantly increasing the cost of the components used. For example, the requirement for expensive filtering and mixing solutions can be avoided.

The receive-carrier signal is the local oscillator signal used to down-mix the received signal to an intermediate frequency or to baseband.

The carrier signals are preferably periodic, typically comprising a sine wave or square wave. The transmit-carrier and receive-carrier are preferably at different frequencies. This means that the transmit-carrier and receive-carrier cannot be phase-locked to have a constant (or zero) offset at all times. Consequently, simple approaches to interference cancellation, which would work if the carriers were at the same frequency, are no longer effective when the carriers are at different frequencies. The first oscillator and second oscillator may share some components and/or a common master clock signal as a timing reference.

In some embodiments, the second mixer is an analogue component and the receiver further comprises an analogue-to-digital converter arranged to digitally sample the down-converted signal generated by the second mixer. Optionally the first mixer is also an analogue component.

This represents a heterodyne receiver architecture, in which down-mixing is performed in the analogue domain, before digitisation. The interference compensation approach may be particularly advantageous in such embodiments, because it can enable a relaxation of the performance-specification for the analogue components. A conventional approach to minimising cross-talk might rely on specifying very high quality analogue components—for example, filters with very sharp roll-off and/or a highly linear second mixer. These components will typically be expensive. By providing an alternative way of compensating for the effects of the interference, the present approach may enable lower cost analogue components to be used, without sacrificing signal quality.

The present interference compensation approach may help to address several specific difficulties with a low cost heterodyne solution: the spreading of the signal due to nonlinearities in the analogue mixers and/or filters; the poor response of a receiver band-pass filter prior to mixing; and a relatively low sampling rate which can cause aliasing of the out of band noise.

In other embodiments, the second mixer is implemented in the digital domain. That is, the received signal is sampled directly using an analogue-to-digital converter and filtering and down-mixing are performed digitally—for example, using a digital signal processor. In this case, the digital implementation can (in theory) avoid non-linearity and achieve arbitrarily sharp filter roll-off. However, this direct-sampling receiver will typically necessitate a higher rate analogue-to-digital converter and a complex digital filter, both of which may be costly to implement. Furthermore, the transceiver may have a line interface which is an analogue component. This component may exhibit non-linearity, giving rise to interference that cannot be compensated for by conventional digital methods. Consequently, the present approach of interference compensation can also be beneficial for a direct-sampling receiver.

The transmitter is preferably adapted to transmit, during a training interval, a plurality of different data symbols or a plurality of different sequences of data symbols; the interference cancellation circuit is preferably adapted to record, during the training interval, an interference signal generated at the receiver by each of the different data symbols or sequences of data symbols; and the interference cancellation circuit is preferably adapted to generate, during full-duplex communication, the estimate of the interference component by selecting one of the recorded interference signals according to the data symbol or sequence of data symbols transmitted by the transmitter.

The far-end transmitter should preferably be silent during the training interval, so that the interference from the near-end transmitter is the only signal received at the receiver. The transceiver records the interference generated by the (near-end) transmitter, during the training interval, to provide a set of recorded interference signals, and may average these over several identical signals to reduce the Gaussian noise component from the estimated interference. During full-duplex communication, the transceiver uses these recorded interference signals to predict the interference component of the local transmitter in the received signal. The interference component is predicted by selecting the earlier-recorded interference signal corresponding to the data symbol or sequence of symbols transmitted in full-duplex mode.

The transmitter is preferably adapted to transmit, during the training interval, a plurality of different sequences of data symbols, the plurality of sequences comprising all possible sequences of a given length.

For example, if each sequence comprises two symbols and each symbol can have two possible states or values, then there will be four possible sequences. The length of the sequence to be used depends upon the "memory" of the interference path. The sequence should preferably be longer than the duration of the expected interference, at the receiver, caused by any given data transition at the transmitter. This will typically depend on the design of the transceiver—for example, the impulse response of any filters in the transmitter and receiver.

The interference cancellation circuit may be adapted to compensate for the interference by subtracting the estimate from the received signal.

Preferably, the estimate is subtracted from the down-converted received signal—that is, after mixing with the receive-carrier signal. More preferably, the receiver comprises an Analogue-to-Digital Converter (ADC) for digitising the down-converted received signal; and the estimate is subtracted from the digitised down-converted signal.

The phase relationship between the transmit-carrier signal and receive-carrier signal may be the same at the start of every data symbol.

This should ensure (at least to a first approximation) that the phase relationship between the two carrier signals evolves in the same way during each symbol. It should also minimise the number of possible permutations of the interference signal that need to be predicted: the interference signal generally depends jointly on the data signal and the phase relationship—holding the phase relationship constant has the effect that the interference signal only varies dependent upon the data signal.

The duration of each data symbol is preferably a first integer multiple of the period of the transmit-carrier signal and a second integer multiple of the period of the receive-carrier signal.

After an integer number of cycles, the phase of the carrier will return to its original value. This is one convenient way to provide the desired constant phase relationship, at the start of every symbol.

The first oscillator circuit and second oscillator circuit may be adapted to generate the carrier signals from a master clock signal.

The transceiver may comprise a reference oscillator, such as a crystal oscillator, for generating the master clock signal.

The transmitter may be adapted to transmit the data symbols with a timing derived from the master clock signal.

The transceiver may comprise a timer arranged to receive the master clock signal from a reference oscillator and to set the timing of the data symbols according to the master clock signal.

The first oscillator circuit may comprise a first divider for generating the transmit-carrier signal from the master clock signal; the second oscillator circuit may comprise a second divider for generating the receive-carrier signal from the master clock signal; and the transmitter may comprise a third divider for generating a data clock signal, wherein the division-ratio of the first divider and the division-ratio of the second divider are both factors of the division-ratio of the third divider.

The divider may be a clock divider—also known as a frequency divider. The division-ratio means the ratio by which the divider decimates the clock signal. For example, if the output of the divider switches once for every 10 switching events at the input, the division-ratio is 10. In this context, a "factor"—also known as a divisor—of an integer, n, means an integer which divides n without leaving a remainder. The data clock signal determines the timing of the data symbols.

The first oscillator circuit may comprise a first numerically controlled oscillator; and the second oscillator circuit may comprise a second numerically controlled oscillator, wherein the transceiver is adapted to adjust the first and second numerically controlled oscillators at the start of each data symbol, to produce the predetermined phase relationship between the carrier signals.

This provides an alternative advantageous way of creating the desired predetermined phase relationship. For example, the first and second numerically controlled oscillators may be controlled to reset at the start of each data symbol, ensuring that the phase at the start of each symbol is the same.

The transmitter is preferably adapted to transmit a spread spectrum signal which is modulated by both the data signal and a spreading code.

The spreading code is preferably a Gold code. The data symbol duration is preferably an integer number of code epochs of the spreading code.

The transceiver is preferably adapted to transmit and receive signals through a power-line communications network.

The present interference cancellation techniques may be particularly beneficial in the power-line communications, because the near-end cross talk generated by the transmitter may be a dominant component of the total noise, in this environment.

Preferably the transceiver is adapted to transmit and receive signals in CENELEC band B. This is a particularly advantageous application of the present interference-cancellation techniques because CENELEC band B is limited in bandwidth and therefore it is desired to have transmit and receive channels that are as closely spaced as possible.

Also provided is a power-line communications network comprising: a first transceiver as summarised above; and a further transceiver comprising a transmitter and receiver, wherein the transmitter of the first transceiver is adapted to transmit a plurality of different data symbols or a plurality of different sequences of data symbols, during a training interval; and the transmitter of the further transceiver is adapted to transmit no signal during the training interval.

The power-line communications network may be adapted for use in monitoring and/or control of energy consumption in a building, such as a home.

The further transceiver may also be of a kind summarised above.

According to another aspect of the invention, there is provided a method of cancelling interference, comprising:
providing a data signal comprising a plurality of data symbols;
providing a transmit-carrier signal and a receive-carrier signal, with a predetermined phase relationship between them at the start of each transmitted data symbol;
mixing the transmit-carrier signal with the data signal to generate an output signal and transmitting said output signal;
mixing the receive-carrier signal with a received signal to generate a down-converted signal;
estimating an interference component present in the received signal due to the output signal, based on the data signal and the predetermined phase relationship; and
compensating for the interference using the estimate.

The interference component may be estimated and compensated for by using the down-converted received signal. For example, the step of compensating may comprise subtracting the estimated interference component from the down-converted received signal, or a digitised version thereof.

The step of estimating the interference preferably comprises: transmitting, during a training interval, a plurality of different data symbols or a plurality of different sequences of data symbols; recording, during the training interval, an interference signal generated in the received signal by each of the different data symbols or sequences of data symbols; and estimating, during full-duplex communication, the interference component by selecting one of the recorded interference signals according to the data symbol or sequence of data symbols transmitted.

BRIEF DESCRIPTION OF THE DRAWINGS

The invention will now be described by way of example with reference to the accompanying drawings, in which.

DETAILED DESCRIPTION OF THE INVENTION

CENELEC band B is an attractive communications channel for providing monitoring and control of energy in the home due to good signal propagation. However, due to the limited bandwidth, the achievable data rate is very low. Therefore, it is desired that the utilization of the channel bandwidth and the management of access to the channel should be handled in an efficient manner, in order to provide the required performance for home energy management. Conventional media access algorithms common in wireless networks are inefficient, when used in this limited channel bandwidth. A solution to this problem has been presented previously by the present inventors, in WO 2011/161476.

One of the characteristics of power-line as a communications medium is that it is subject to highly variable load conditions and significant noise due to the ever-changing topology of the network as devices are connected and disconnected and the switching of large currents (often into inductive loads).

Embodiments of the present invention can be used to improve the sensitivity of the receiver in a power-line application like the one addressed in WO 2011/161476. However, while the present solution has been designed with such embodiments in mind, it is also applicable to other full duplex communications systems where the channel separation between the Tx and Rx channels is insufficient for conventional solutions to work.

Figure 1:
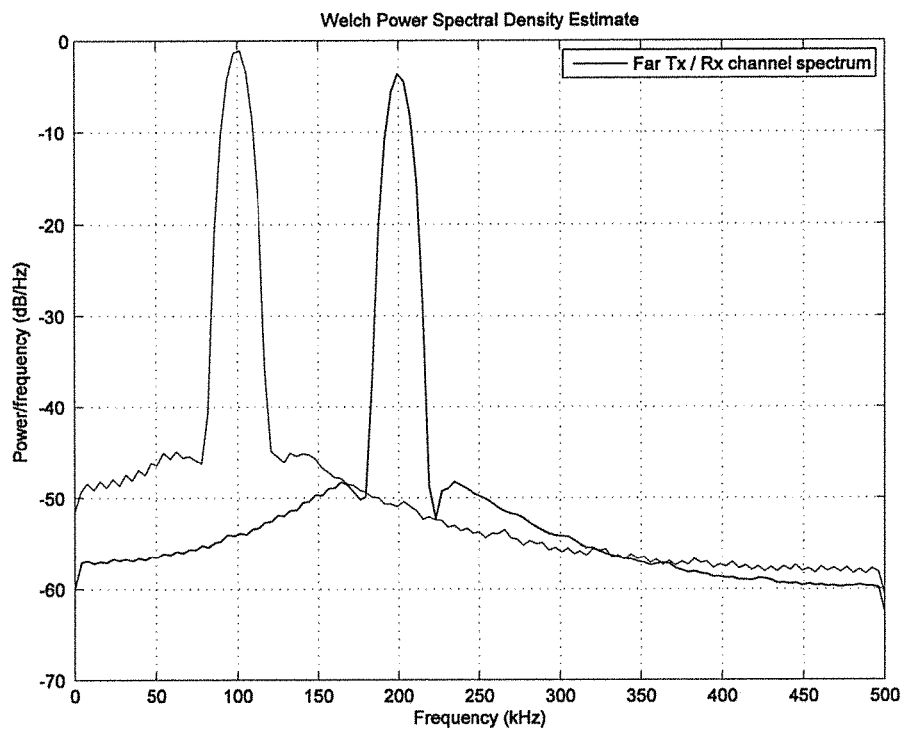
FIG. 1 shows a typical channelization of a full-duplex communication system with wide separation between the transmit and receive channels.
Figure 2:
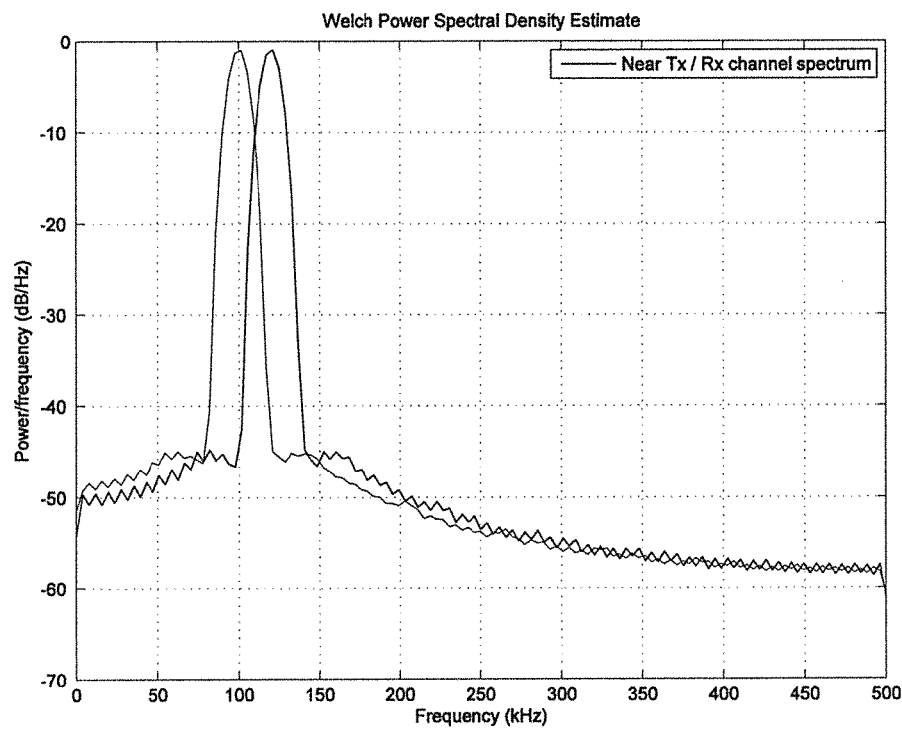
FIG. 2 shows a similar channelization of a full-duplex communications system where the channel separation is significantly smaller.
Figure 3:
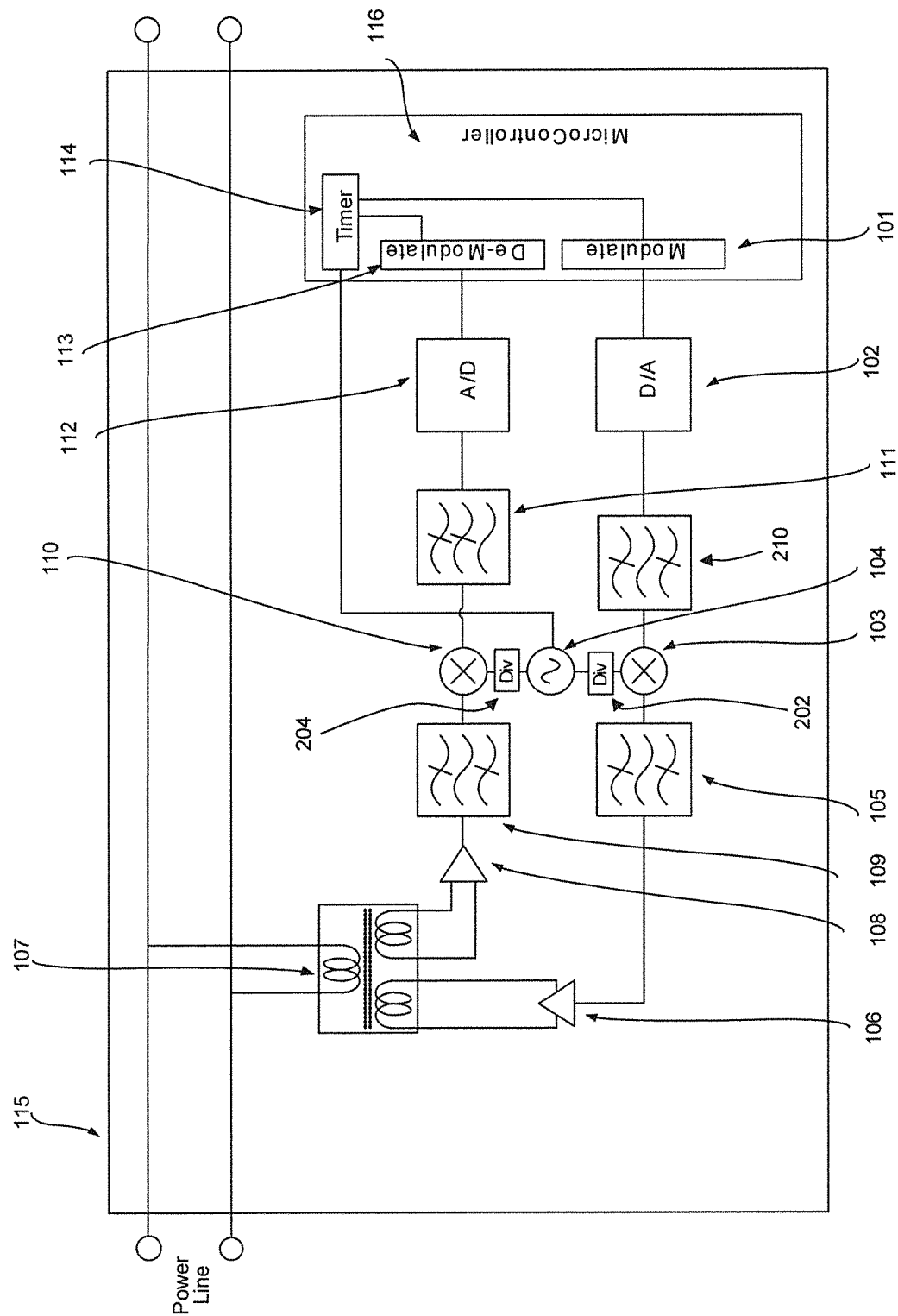
FIG. 3 shows a low-cost full-duplex power-line communications system according to a first embodiment of the invention.

FIG. 3 shows a low-cost full-duplex power-line communications system according to a first embodiment of the invention. The transceiver is similar to that described in WO 2011/161476 but provides interference cancellation in order to increase the sensitivity of the receiver.

A single reference frequency such as a low cost crystal (xtal) oscillator 104 provides a common reference frequency for the entire system. This is used to drive the carrier frequency oscillators and a timer 114 for the data generation control. The timer 114 is operated from a clock source and is used to synchronize both the Tx and Rx carriers, driven by local oscillator 104, and the signal modulation 101 and demodulation 113 blocks. The transmit-carrier signal is generated from the crystal reference by frequency divider 202 and the receiver-carrier signal is generated from the same reference by frequency divider 204. By synchronizing the local oscillators with the symbol modulation/de-modulation, and using a common clock reference for all timing it is possible to predict and compensate for the interference caused by the local Tx signal in the Rx signal, thereby improving sensitivity for receiving signals from the distant (far-end) transmitter. How this can be achieved will be explained in greater detail below.

Data for transmission is generated at baseband by the modulator 101 in the digital domain, and is then converted to an analogue signal by a Digital-to-Analogue Converter (DAC) 102. The analogue signal is then mixed with the transmit carrier frequency by mixer 103 and filtered by a band-pass filter 105 to control the transmit spectrum. The filtered signal is then buffered by the driver 106 and interfaced to the media through a coupling circuit 107. In the embodiment of FIG. 3, a transformer is shown, but other suitable coupling circuits will be known to those skilled in the art.

Data received from the media is also coupled through the same coupling circuit 107, amplified using an amplifier 108, and filtered to select the desired channel using a second band-pass filter 109. The signal is then down-converted by a second mixer 110; the down-converted signal is filtered by a low-pass filter 111 and the output of the filter 111 is sampled using an analogue-to-digital converter 112 before being passed to a demodulator 113 for demodulation to extract the data message that was sent by the far-end transmitter.

In this embodiment, the modulation and de-modulation is performed in a microcontroller 116, and for cost and size reasons all functions are implemented on a single low cost PCB 115. The microcontroller 116 performs all timing co-ordination as well as signal generation and decoding for the mains-borne communications protocol.

It can be seen that there are many paths which could allow the transmit signal from the near-end transmitter to be coupled into the receiver's data path—for example: parasitic capacitances; through the power supply; through magnetic coupling between the inductors in the filters; and through the coupling circuit 107. In full duplex communications systems, it may be impossible to entirely prevent leakage of the transmitted signal back into the receive path, and in many cases this signal will be at a power level that is orders of magnitude greater than the signal received from the far-end. Hence, it is desirable in full duplex systems to prevent the transmitted signal getting through the filters and mixers of the receive-chain.

In practice, the achievable channel sensitivity and bandwidth in such systems is governed by the Signal-to-Noise Ratio (SNR) of the received signal and the dominant source of noise is often caused by the device's own transmit power.

The topology of the network comprises a central hub communicating with multiple nodes. As described in WO 2011/161476, the system uses a full duplex communications protocol based on a Time Division Multiple Access (TDMA) system. For this, it requires accurate time synchronization of nodes in order to grant access to the medium to the connected devices. To achieve this, the central controller continuously transmits a signal which is modulated by a timing reference signal also used to carry control information.

The central hub's signal is bandwidth limited by a Tx filter 210 then up converted by the low cost Tx mixer 103 to a frequency of 100 KHz, and further filtered through the Tx filter 105 to limit the spectrum of the transmitted signal and supress spurious energy emissions, so as to meet the CENELEC B regulations. Note that in some embodiments, the Tx filter 210 may be implemented digitally as part of the modulator 101. For example, the filtering may be performed by software.

Received energy from the connected nodes is pre-filtered by the Rx filter 109 and fed to the low cost Rx mixer 110 where it is mixed with the Rx carrier and filtered to extract the baseband signal and constrain the bandwidth for sampling. This baseband Rx signal is then sampled and passed to the microcontroller 116 for further filtering and cancellation of the Tx signal aliased components, by means of digital signal processing.

Because of the line interface and the proximity (both physically and in the frequency domain) of the Tx and Rx channels, it is not possible to remove the near-end transmitted signal from the input to the receive mixer 110. Generally, this transmitted signal is actually stronger than the received signal from many nodes (the far-end transmitters).

Since power-line has an extremely low impedance at this band—typically of the order of a few ohms—the attenuation of signals is significant. Hence, it is necessary to transmit a significant amount of energy into a low impedance load. However, due to the signal attenuation, this medium has relatively low noise energy in that spectrum—the main noise being due to transients and having short duration. This results in a line interface carrying a significant current in the Tx path and an Rx interface sharing the same components with a signal that may be 50 dB attenuated. In this environment, the dominant interferer is noise from the local (near-end) transmitter.

In an ideal world with perfect components, the roll-off of the filter 111 at the output of the Rx mixer would be adequate to reduce the Tx energy. However, in the real world, the non-linearities in the Tx and Rx Mixers and filters inevitably result in a significant energy component of the Tx signal being present in the Rx signal. In practice filters 105, 109 mixers 103, 110 amplifiers 106, 108 and the coupling circuit 107 are all non-linear and therefore distort the Tx signal, spreading the bandwidth such that after filtering the Rx signal in filter 109 there is a significant energy bleed from the Tx signal into the Rx signal. Once sampled, the energy is all within the bandwidth of the Rx channel, so at this point it is impossible to remove with conventional filtering solutions. In other words, the signal at the input of A/D 112 will have a significant amount of noise which is a function of the signal at the output of the D/A 102. Practical experience has shown that with an acceptable complexity and manufacturing cost these interfering signals significantly limit the sensitivity and dynamic range that can be achieved in a low-cost consumer product.

To achieve the highest level of sensitivity, it is desired to reduce this spurious energy from the Tx component to the point where it is significantly below the actual noise injected by the medium so that the theoretical limits of the communications channel range are limited by the medium rather than locally generated interference. Since the transmitted signal is being generated by the same device it is theoretically possible to compute the expected Tx energy in the received channel and subtract it from the received signal such that all that remains is the desired received signal and medium injected noise. However, in practice there are a number of problems with this approach, such that computation of this component is difficult. For example, significant spreading of the Tx spectrum is generated by non-linearities in analogue components, which is not repeatable between devices and which is also a function of temperature and component aging. Once the signal has been sampled, there will always be a signal component that does not behave as predicted, due to aliasing of the signal caused by sampling, since the pre-sampling filter cannot be perfect. Additionally, this process is greatly complicated since the phase of the interfering component from the transmitter must be known in order to remove it. However, since the signal has passed through both the Tx and Rx mixers, this phase computation is difficult.

A solution to all of these problems is to measure the component of the transmitted signal received during a training period when there is no far-end signal present, and then to subtract this from the Rx signal prior to further digital filtering. However, for this to be possible, the phase uncertainty must be removed.

In order to remove the phase uncertainty caused by mixing of the transmitter energy with two carriers (first in the transmit mixer 103 and then in the receive mixer 110) it is necessary to have a predictable phase relationship between the transmit and receive carriers. In the present embodiment, this is achieved by generating both carriers from a common clock in such a manner that the phase relationship repeats cyclically. Having a known phase relationship, or a function defining it, would allow the signal to be predicted at any instant if the mixers were perfect. However, in a typical transmission system the transmitted data signal is not balanced over time, and the effect of this is for changes in the transmit data to affect the DC bias onto the signal feeding the filters 210 and 111 and mixers 103 and 110. This also has a small effect on the responses of the filters 210 and 111 and the mixers, so that the received interference energy caused by the local transmitter becomes a function also of the data symbol sequence transmitted.

Typically, if the data symbols transmitted in the data signal were all identical, the received signal would settle down over time to a repeated noise pattern. (If the signal is repetitive the DC bias will settle, but signal changes affect the DC bias. Typically this affects the inductor's behaviour.) However, when the data symbol changes, the received signal is affected, and the effect takes time to settle. This is the disturbance caused by the data symbol transitions.

In order to provide a simple mechanism to substantially remove the Tx component from the Rx signal, it is necessary to determine the duration of such disturbance and to hold a sample table holding the measured interference long enough to be able to correct for these transitions. The table must also cover all possible data symbol transition-sequences which can occur over this period. Hence, the period should ideally be as short as possible. Having determined the duration of disturbance, which is a function of the filter design, a transmission scheme can then be designed in which a known Tx/Rx Carrier phase alignment and data symbol transitions occur at a constant rate, which must be at an integer multiple of the data symbol duration. In this way, the phase of the Tx and Rx carriers will be the same for all data symbol transitions, thus removing the phase uncertainty completely and allowing the sampled data to be subtracted.

Since cancellation is performed in the digital domain the interference can be removed by subtracting the interference from the A/D outputs, or if further decimation occurs then the cancellation may be applied at a lower rate at the output of the decimator, which reduces the required data table's size. Finally, once the data symbol duration is determined and the duration of the disturbance is known, a table is constructed for all possible Tx bit sequences during that period. Then the system can use the measured disturbance tables to substantially cancel the Tx signal component.

In order to generate the table of measurements the transmitter must generate a sequence containing all possible data symbol transition combinations, transmit this signal and measure the received signal whilst no other device (that is, far-end transmitter) is transmitting. In the present embodiment, this is achieved architecturally by defining a protocol wherein the transmitter in the hub periodically sends a SYNC pattern. The nodes receive this pattern and use it for timing and frequency synchronization and therefore never transmit during that period. Consequently, this signal time period is used to continuously measure the interference generated by the near-end transmitter at the hub and to maintain the tables such that any changes in the response due to component variations are continually corrected. Such variations may be caused by aging and temperature variation, for example. In order to achieve this, the SYNC sequence is designed to be longer than the duration of the disturbance and to include all possible data symbol transitions. For example, if the interference lasts for 2 symbols, then a 5-symbol sequence is required for training: the sequence 01100 is 5 symbols long but contains 4 usable symbol pairs: 01, 11, 10, and 00.

In the present embodiment, a spreading code is used to modulate the data symbols prior to mixing with the Tx carrier. The spreading code length is determined to be an even number of symbols and balanced to avoid a build-up of DC bias over time. The transmit carrier frequency is set at 120 KHz, and the receive carrier is set at 100 KHz. The gold code duration is 480 samples at 18.75 KHz. Consequently, the gold code duration is precisely 3072 Tx carrier cycles and 2560 Rx carrier cycles. This ensures that the Tx and Rx carrier phase is fixed at every symbol start period. These frequencies are selected in order to allow all frequencies to be derived from a single reference frequency of 48 MHz using integer divisions by even numbers. Hence, they represent just one of a wide range of possible solutions to this requirement. The divisions are performed by the frequency dividers 202 and 204, in FIG. 3.

Figure 4:
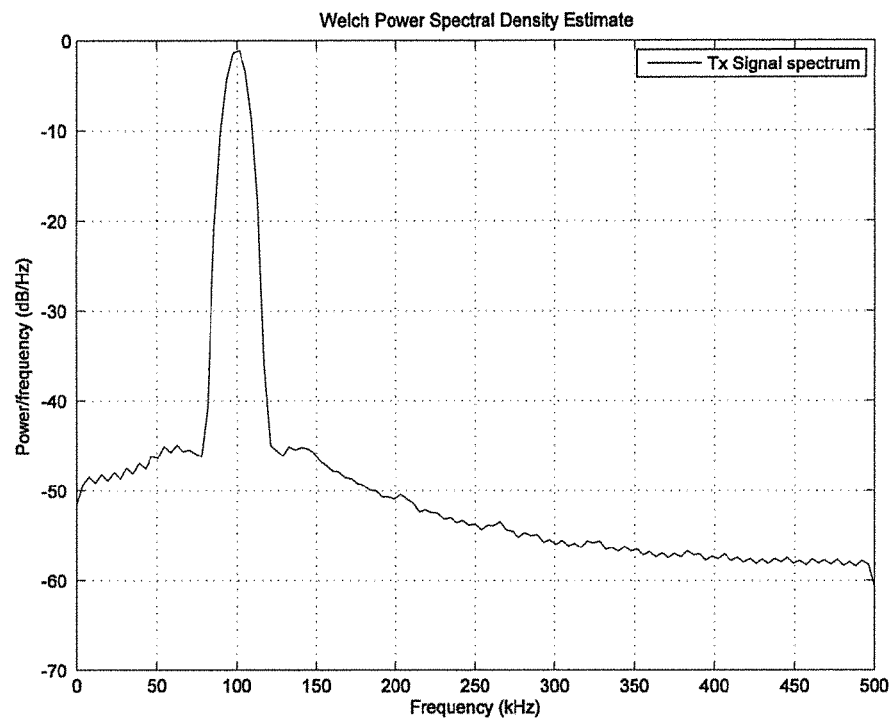
FIG. 4 shows the local transmit spectrum at the output of the transmit filter.
Figure 5:
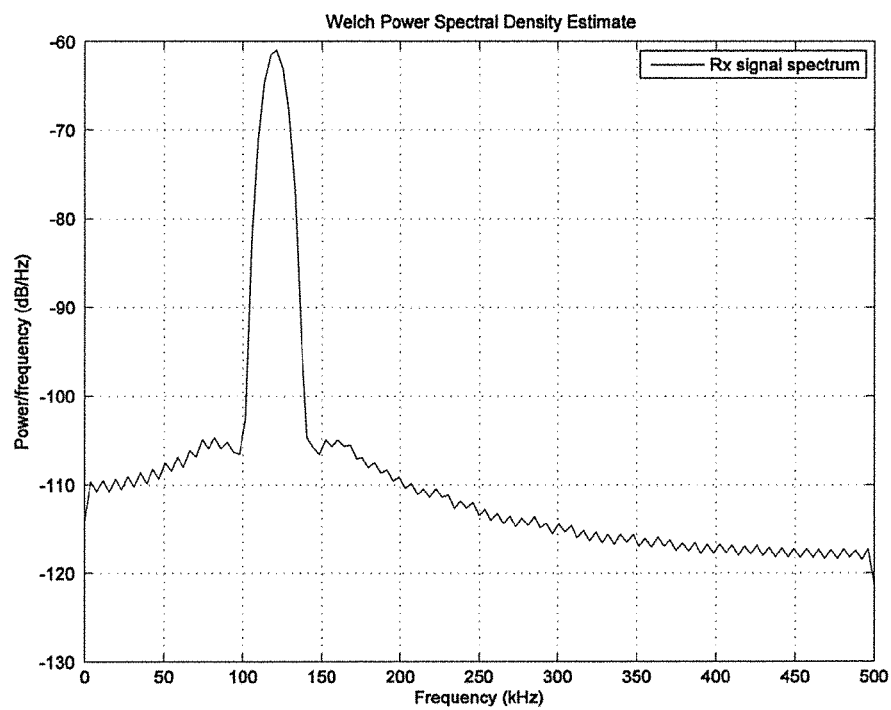
FIG. 5 shows the receive spectrum with receive path attenuation of 60 dB.
Figure 6:
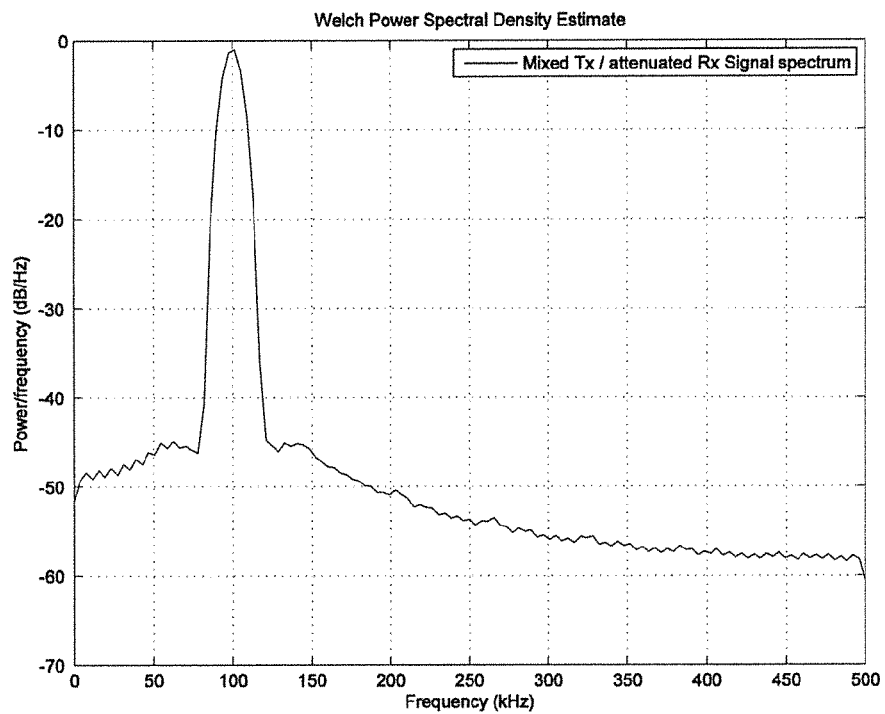
FIG. 6 shows the received signal spectrum after applying receive-path attenuation.
Figure 7:
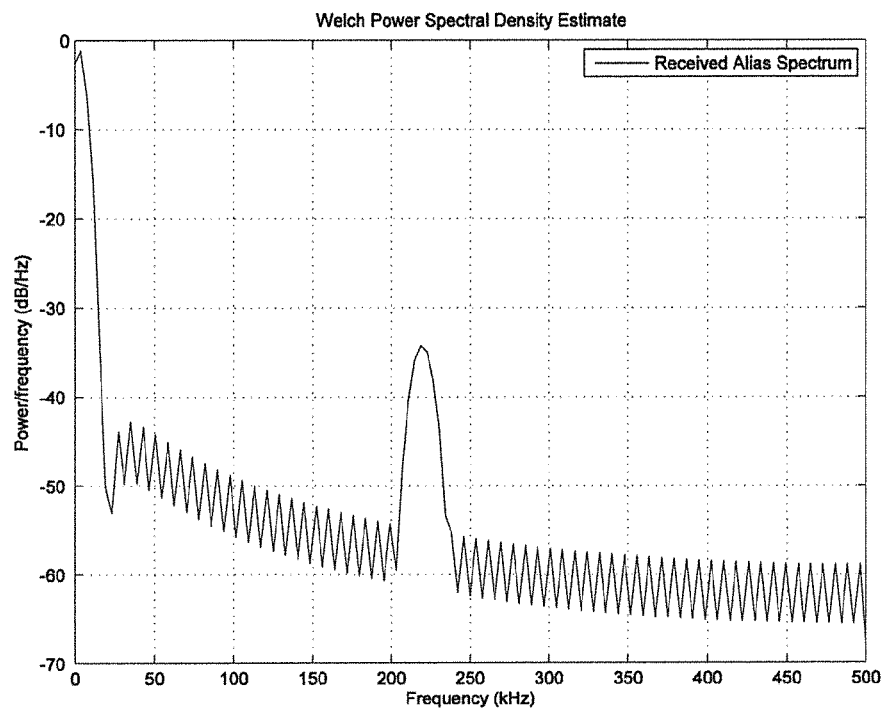
FIG. 7 shows the spectrum of the received component of the local transmitter signal at the output of the de-modulator.
Figure 8:
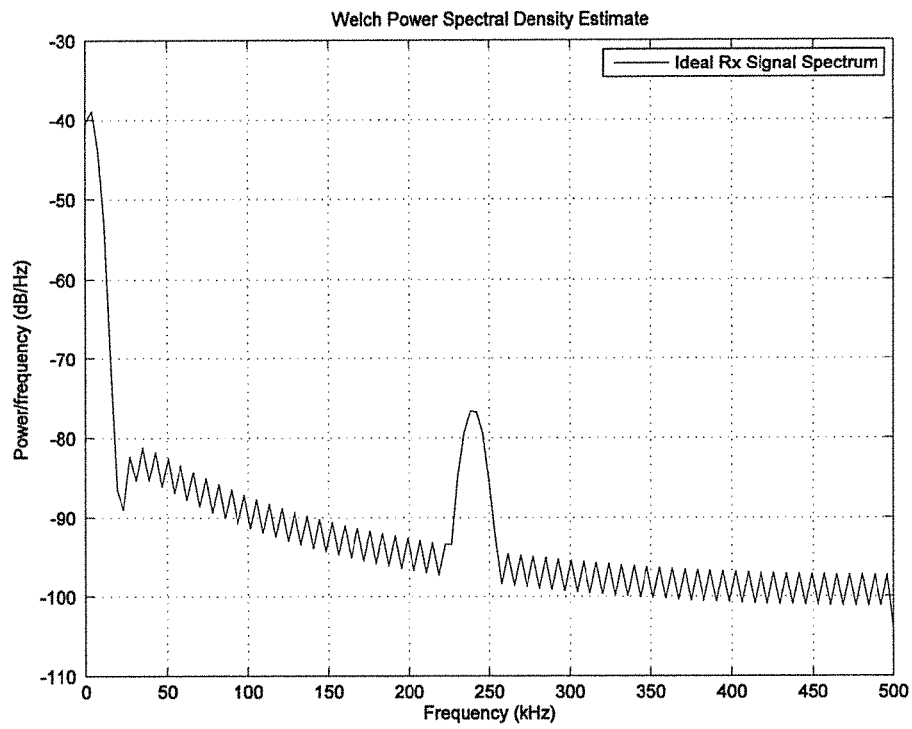
FIG. 8 shows the ideal output spectrum of the de-modulator when the local transmitter is silent.
Figure 9:
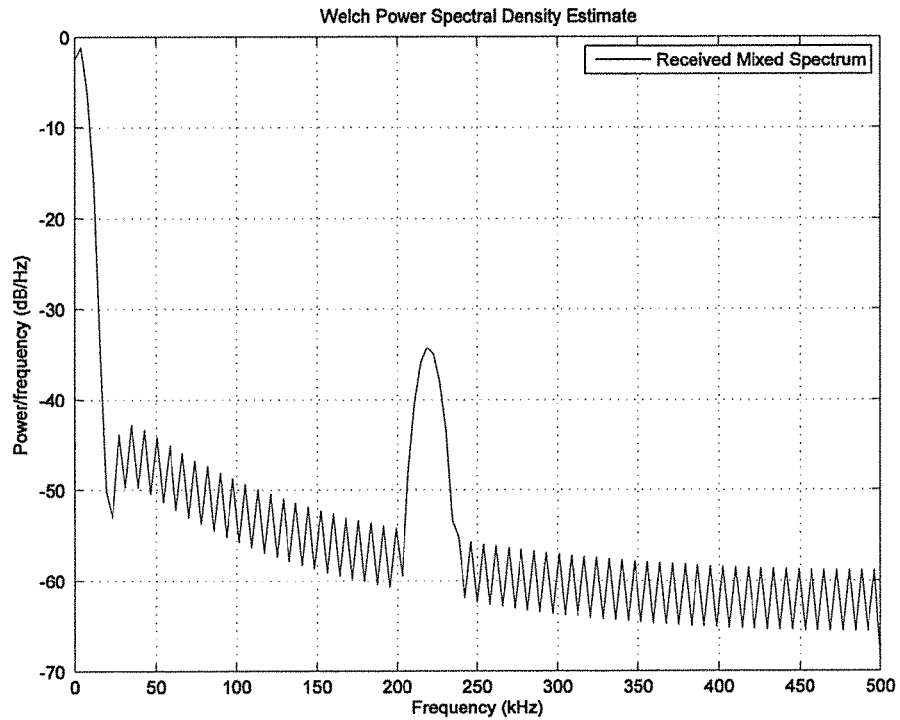
FIG. 9 shows the output spectrum of the de-modulator when the local and remote transmitters are both active, without cancellation.
Figure 10:
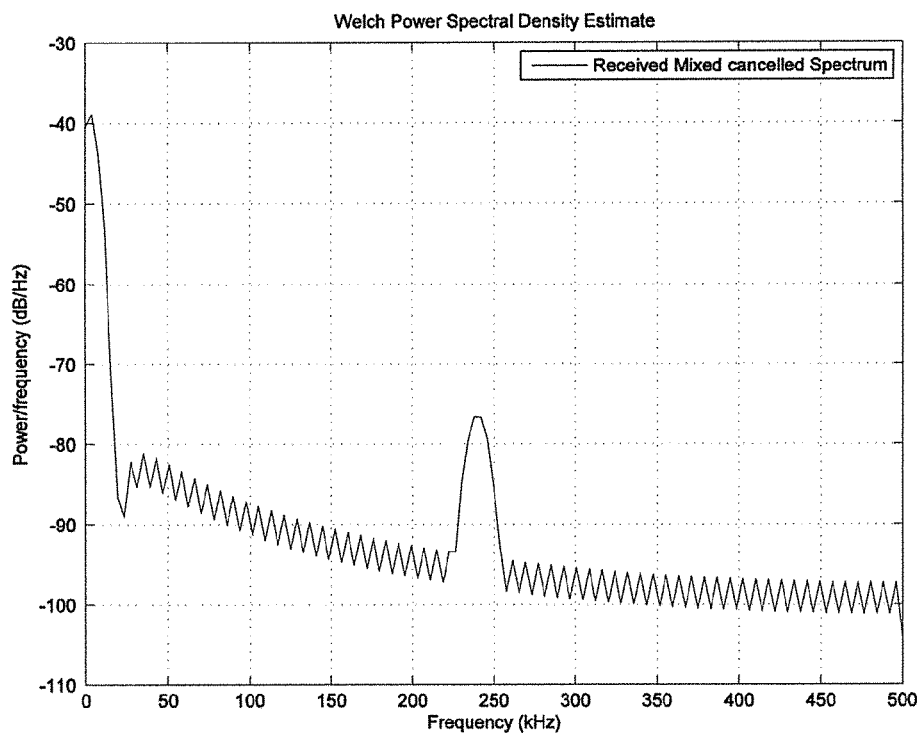
FIG. 10 shows the same spectrum when interference cancellation according to an embodiment of the present invention is applied.
Figure 11:
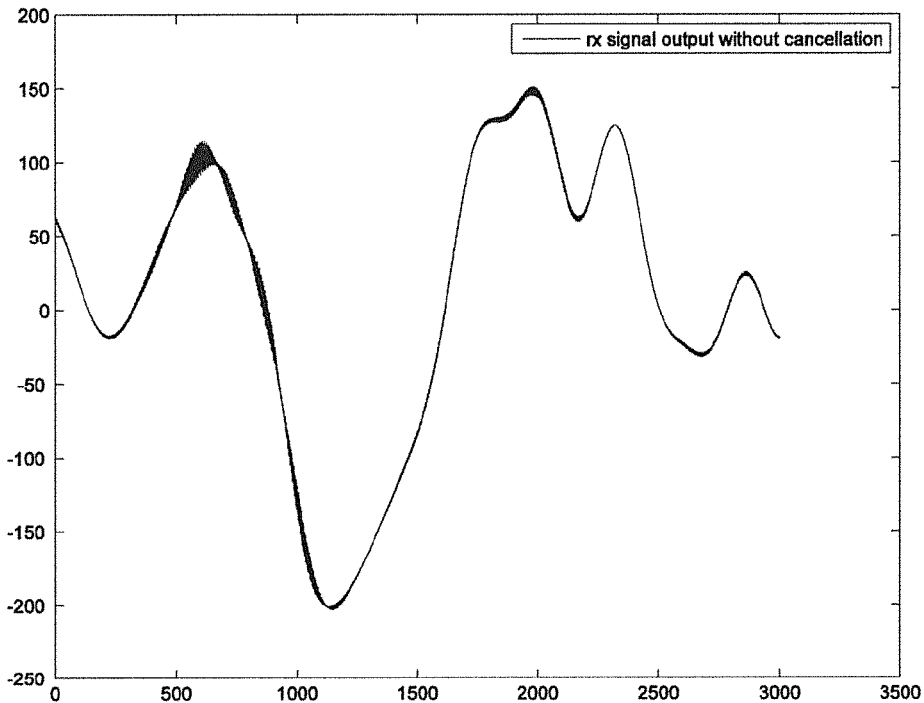
FIG. 11 shows the raw output of the demodulator with the local transmitter active.
Figure 12:
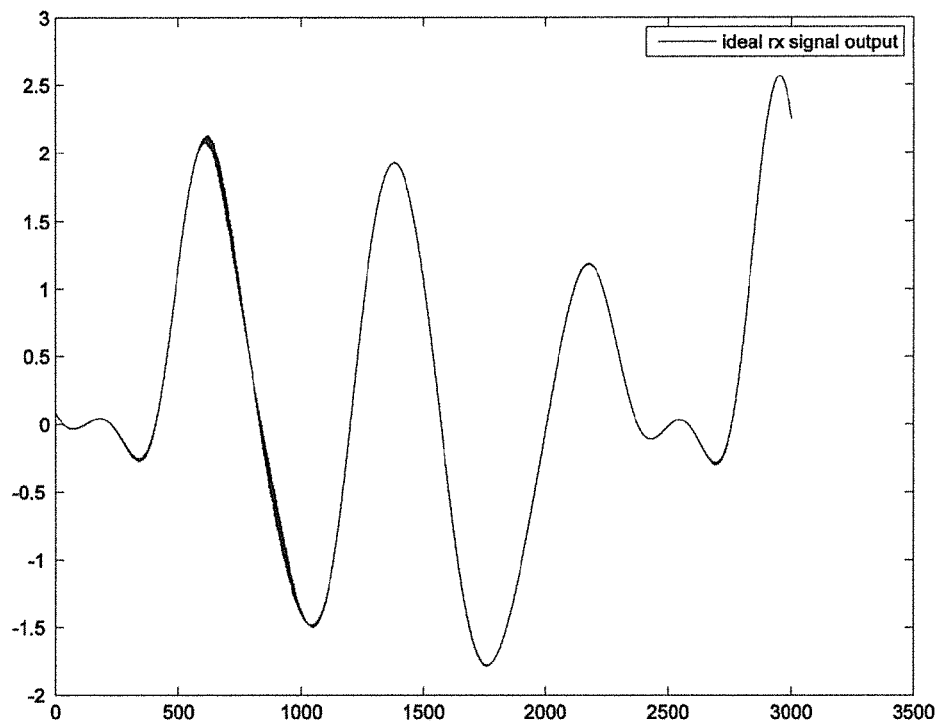
FIG. 12 shows the ideal raw output of the demodulator.
Figure 13:
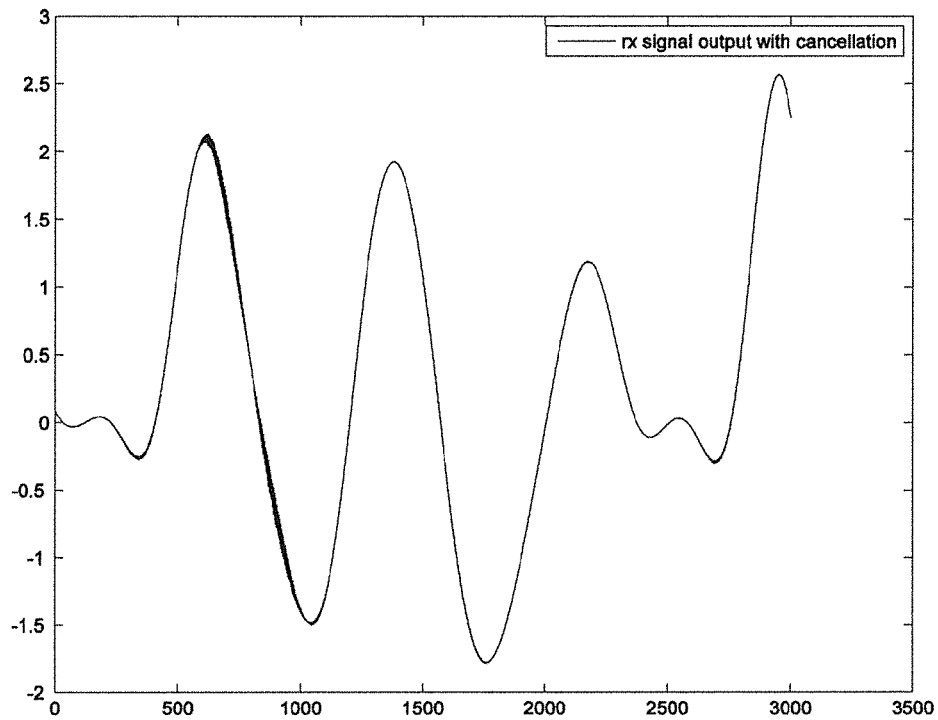
FIG. 13 shows the raw output of the demodulator with interference cancellation active, according to an embodiment of the present invention.
Figure 14:
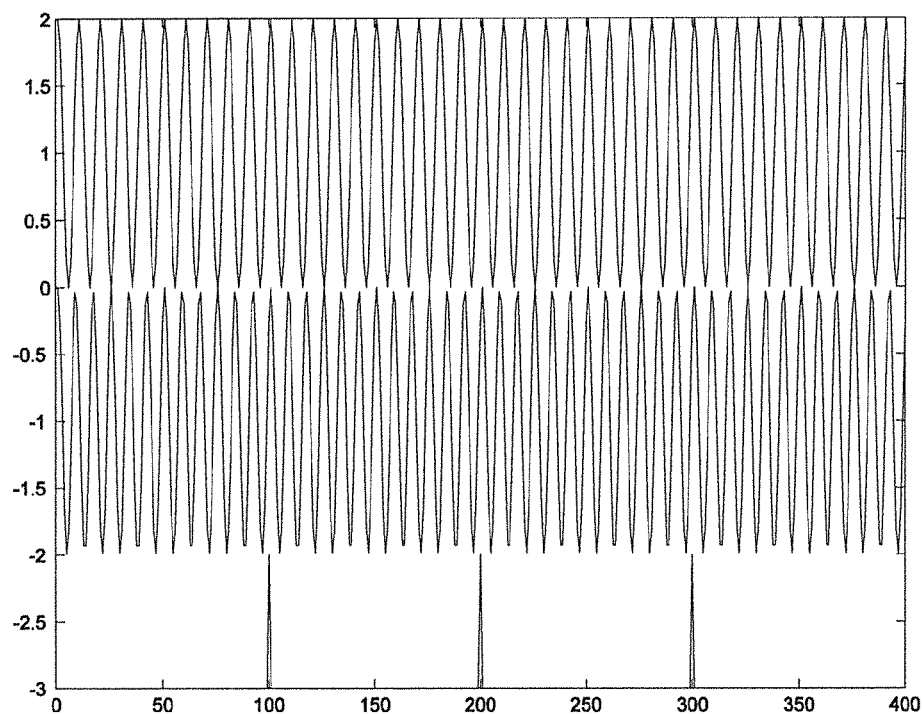
FIG. 14 illustrates the transmit- and receive-carriers and frame timing.

FIGS. 4 to 14 illustrate the effect of near-end interference on signal-sensitivity using typically achievable filter performance. FIG. 4 shows the local Tx spectrum, normalised to 0 dB at the Tx centre frequency. This is the typical output signal of the Tx filter 105. FIG. 5 shows the Rx spectrum with receive path attenuation of 60 dB. This is typical of the received signal at the media interface 107. FIG. 6 shows the received signal spectrum after applying the receive path attenuation. This is the signal at the media interface 107 and is dominated by the Tx signal. FIG. 7 shows the spectrum of the received component of the local Tx signal at the output of the de-modulator. With the local Tx active, a large amount of energy is present at the demodulator; however, this is dominated by energy from the local Tx and makes it impossible to demodulate the true (far-end) signal since the energy is in the same bandwidth. FIG. 8 shows the ideal output spectrum of the de-modulator when the local Tx is not active. Note that the true Rx signal is 40 dB below the noise signal from the local Tx. FIG. 9 shows the output spectrum of the de-modulator when the local and remote Tx are both active without cancellation. The signal is dominated by the local Tx energy. Note the peak at 220 KHz, which is the mixing product of the 100 KHz Tx and 120 KHz Rx carriers. FIG. 10 shows the output spectrum of the de-modulator when the local and remote Tx are both active and echo cancellation is applied. Now, the Tx energy has been completely removed. The spurious peak is at 240 KHz caused by the mixing of 120 KHz remote Tx with 120 Khz local Rx oscillators, indicating that the energy is dominated by the true received signal. FIG. 11 shows the raw output of the demodulator with Tx active. The waveform is unintelligible as it is dominated by the local Tx signal and mixed with 120 KHz and 100 KHz oscillators. FIG. 12 shows the ideal raw output of the demodulator, which is the true BPSK modulated signal. FIG. 13 shows the raw output of the demodulator with echo cancellation active. The energy from the local Tx has been substantially removed, revealing the ideal Rx signal. FIG. 14 illustrates Tx and Rx Carriers and frame timing. The upper plot illustrates a Tx carrier of 100 KHz, and the middle plot shows an Rx mixer frequency of 120 KHz. The lower plot indicates the symbol timing points. At each of these points the Tx carrier and Rx mixer oscillators have a consistent phase relationship. By applying Tx data modulation synchronized to these timing points the phase relationship of the Tx and Rx oscillators is predictable at all points during the symbol transmission, this makes it possible to measure and remove any Rx disturbance.

While the invention has been illustrated and described in detail in the drawings and foregoing description, such illustration and description are to be considered illustrative or exemplary and not restrictive; the invention is not limited to the disclosed embodiments.

For example, in the main embodiment described above, the transmit and receive carrier frequencies were derived from a single reference crystal oscillator, by means of clock division (frequency division). This is one way to provide the desired phase relationships. However, this can also be achieved in other ways.

For instance, it is possible to use Numerically Controlled Oscillators (NCOs) to generate the transmit and receive carrier signals. In this case, it is possible to set the NCO's to generate arbitrary frequencies with a very small relative phase shift over a sample period. Provided this shift offset is small enough, the NCO can be re-synchronized at the start of each data symbol to force the precise frequency as this may not be achievable directly using an NCO. An NCO uses an integer divider, which is really just an adder. A fractional NCO is similar but effectively has a modulo operation. By way of example: for a 20 bit NCO (range 1024×1024), if 1025 is used as the addend the output is F/1023. However, 1023×1025=2^20−1, so there is an error which accumulates; nevertheless, the error is so small that it can be ignored by resetting the NCO to 0. NCO's and fractional NCO's are well known to those skilled in the art.

Figure 15:
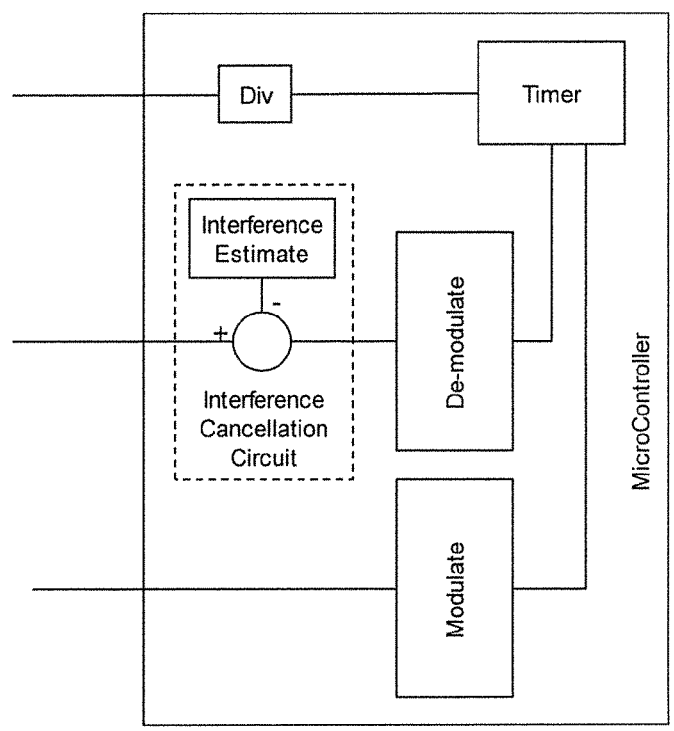
FIG. 15 shows the microcontroller of the embodiment of FIG. 3 in greater detail.
Figure 16:
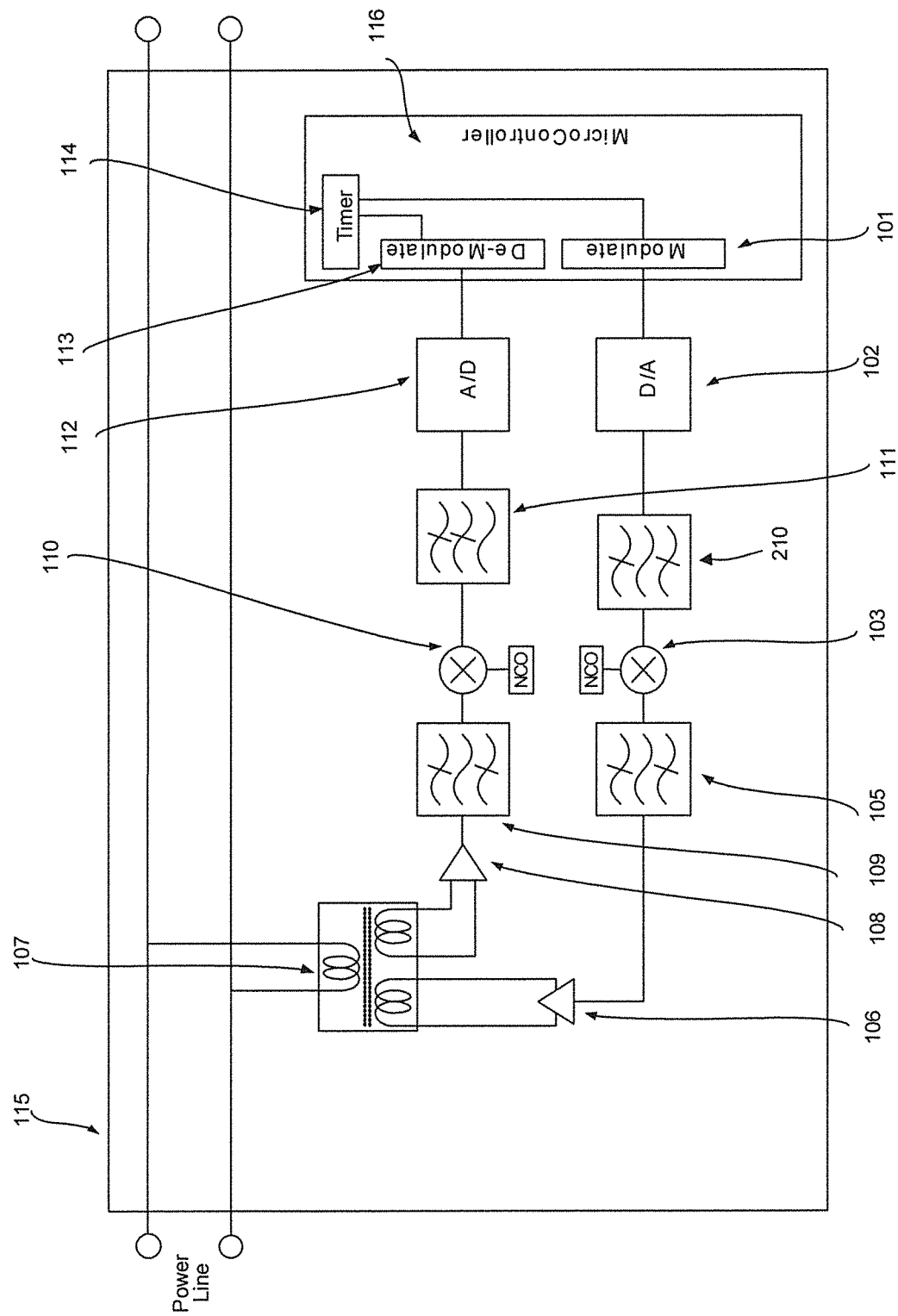
FIG. 16 shows a low-cost full-duplex power-line communications system according to an alternative embodiment of the invention.
Figure 17:
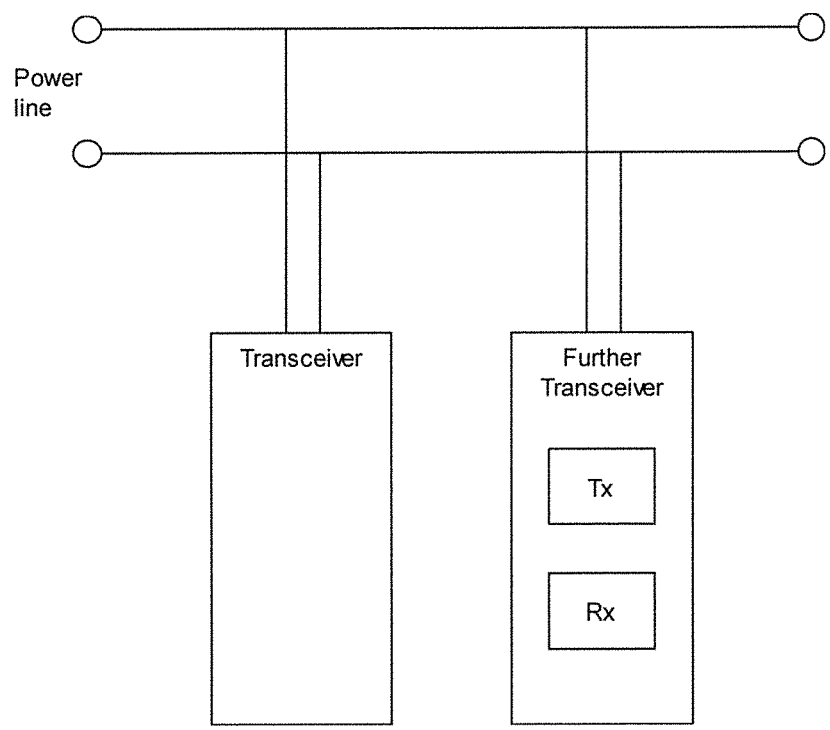
FIG. 17 illustrates an exemplary power-line communications network according to an embodiment of another aspect of the invention.

In the illustrated embodiment, the first oscillator circuit and second oscillator circuit generate the carrier signals from a master clock signal. The transceiver comprises a reference oscillator, such as the crystal oscillator 104, for generating the master clock signal. The transmitter is adapted to transmit the data symbols with a timing derived from the master clock signal. The transceiver comprises a timer 114 arranged to receive the master clock signal from the reference oscillator 104 and to set the timing of the data symbols according to the master clock signal. The first oscillator circuit comprises the first divider 202 for generating the transmit-carrier signal from the master clock signal. The second oscillator circuit comprises the second divider 204 for generating the receive-carrier signal from the master clock signal. The transmitter comprises a third divider, see FIG. 15, for generating a data clock signal from the master clock signal. The division-ratio of the first divider 202 and the division-ration of the second divider 204 are both factors of the division-ratio of the third divider.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot

The invention claimed is:

1. A transceiver for full-duplex communication, comprising:
   a transmitter, having
      a first oscillator circuit, for generating a transmit-carrier signal; and
      a first mixer, for up-converting a data signal to be transmitted by mixing it with the transmit-carrier signal, said data signal comprising a plurality of data symbols; and
   a receiver, having:
      a second oscillator circuit, for generating a receive-carrier signal at a different frequency to the transmit-carrier signal; and
      a second mixer for down-converting a received signal by mixing it with the receive-carrier signal,
   wherein the first oscillator and the second oscillator are controlled such that there is a predetermined phase relationship between the transmit-carrier and receive-carrier signals at the start of each transmitted data symbol,
   the transceiver further comprising an interference cancellation circuit adapted to generate, based on the data signal and the predetermined phase relationship, an estimate of an interference component present in the received signal, and to compensate for the interference using the estimate.

2. The transceiver of claim , wherein:
   the transmitter is adapted to transmit, during a training interval, a plurality of different data symbols or a plurality of different sequences of data symbols;
   the interference cancellation circuit is adapted to record, during the training interval, an interference signal generated at the receiver by each of the different transmitted data symbols or each of the different sequences of transmitted data symbols; and
   the interference cancellation circuit is adapted to generate, during the full-duplex communication, the estimate of the interference component by selecting one of the recorded interference signals according to the data symbol or sequence of data symbols transmitted by the transmitter.

3. The transceiver of claim 2, wherein the transmitter is adapted to transmit, during the training interval, a plurality of different sequences of data symbols, the plurality of sequences comprising all possible sequences of a given length.

4. The transceiver of claim 1, wherein the interference cancellation circuit is adapted to compensate for the interference by subtracting the estimate from the received signal.

5. The transceiver of claim 1, wherein the phase relationship between the transmit-carrier signal and receive-carrier signal is the same at the start of every data symbol.

6. The transceiver of claim 5, wherein the duration of each data symbol is a first integer multiple of the period of the transmit-carrier signal and a second integer multiple of the period of the receive-carrier signal.

7. The transceiver of claim 1, wherein the first oscillator circuit and second oscillator circuit are adapted to generate the carrier signals from a master clock signal.

8. The transceiver of claim 7, wherein the transmitter is adapted to transmit the data symbols with a timing derived from the master clock signal.

9. The transceiver of claim 8, wherein:
   the first oscillator circuit comprises a first divider for generating the transmit-carrier signal from the master clock signal;
   the second oscillator circuit comprises a second divider for generating the receive-carrier signal from the master clock signal; and
   the transmitter comprises a third divider for generating a data clock signal,
   wherein the division-ratio of the first divider and the division-ratio of the second divider are both factors of the division-ratio of the third divider.

10. The transceiver of claim 1, wherein:
    the first oscillator circuit comprises a first numerically controlled oscillator; and
    the second oscillator circuit comprises a second numerically controlled oscillator,
    wherein the transceiver is adapted to adjust the first and second numerically controlled oscillators periodically, to produce the predetermined phase relationship between the carrier signals.

11. The transceiver of claim 1, wherein the transmitter is adapted to transmit a spread spectrum signal which is modulated by both the data signal and a spreading code.

12. The transceiver of claim 1, adapted to transmit and receive signals through a power-line communications network.

13. The power-line communications network comprising:
    the transceiver as claimed in claim 12; and
    a further transceiver comprising a transmitter and receiver,
    wherein the transmitter of the transceiver is adapted to transmit a plurality of different data symbols or a plurality of different sequences of data symbols, during a training interval; and
    the transmitter of the further transceiver is adapted to transmit no signal during the training interval.

14. A method of cancelling interference, comprising:
    providing a data signal comprising a plurality of data symbols;
    providing a transmit-carrier signal and a receive-carrier signal, at different frequencies, with a predetermined phase relationship between them at the start of each transmitted data symbol;
    mixing the transmit-carrier signal with the data signal to generate an output signal and transmitting said output signal;
    mixing the receive-carrier signal with a received signal to generate a down-converted signal;
    estimating an interference component present in the received signal due to the output signal, based on the data signal and the predetermined phase relationship; and
    compensating for the interference using the estimate.

15. The method of claim 14, wherein the step of estimating the interference component comprises:
    transmitting, during a training interval, a plurality of different data symbols or a plurality of different sequences of data symbols;
    recording, during the training interval, an interference signal generated in the received signal by each of the different data symbols or sequences of data symbols; and
    estimating, during full-duplex communication, the interference component by selecting one of the recorded interference signals according to the data symbol or sequence of data symbols transmitted.

* * * * *